US005618234A

United States Patent [19]
Carden

[11] Patent Number: 5,618,234
[45] Date of Patent: Apr. 8, 1997

[54] CONSTANT VELOCITY UNIVERSAL JOINT

[75] Inventor: John C. Carden, Nassau, Bahamas

[73] Assignee: Lica Carden (IPR) Limited, London, England

[21] Appl. No.: 388,841

[22] Filed: Feb. 15, 1995

[30] Foreign Application Priority Data

Feb. 16, 1994 [GB] United Kingdom ............... 9402978

[51] Int. Cl.$^6$ .............................. F16D 3/16; F16D 3/30
[52] U.S. Cl. ..................................... 464/109; 464/147
[58] Field of Search .................................... 464/106, 109, 464/147, 185, 180, 151; 403/57, 74

[56] References Cited

U.S. PATENT DOCUMENTS

| | | | |
|---|---|---|---|
| 2,057,736 | 10/1936 | Parville | 464/151 |
| 2,715,325 | 8/1955 | Du Pont | 464/106 |
| 2,921,451 | 1/1960 | Helmke | 464/106 |
| 2,924,955 | 2/1960 | Sharman et al. | 464/106 |
| 3,961,497 | 6/1976 | Cohen | 464/109 |
| 4,103,513 | 8/1978 | Grosser | 464/109 |

FOREIGN PATENT DOCUMENTS

914208  6/1954  Germany .

Primary Examiner—Daniel P. Stodola
Assistant Examiner—Matthew A. Kaness

[57] ABSTRACT

A constant velocity joint comprises two shafts with respective opposed ends carrying respective flanges whose external shape is part-spherical and in which respective part-cylindrical recesses are formed, the axes of which intersect at the geometrical centre of the joint. Two spiders are provided, each including a part-cylindrical portion slidably received in a respective part-cylindrical recess and a part-annular cylindrical portion, the axes of the part-cylindrical portion and part-annular cylindrical portion being perpendicular to one another. A central member affords two part-annular cylindrical recesses, the axes of which are coincident and constitute the axis of the central member. Each recess slidably received a respective one of the part-annular cylindrical portions. The axis of the recesses passes through the geometrical centre. The two spiders are geared together to transmit rotational movement between them such that the two spiders are constrained to rotate through equal distances but in opposite directions about the axis of the central member.

19 Claims, 4 Drawing Sheets

CONSTANT VELOCITY UNIVERSAL JOINT

Background of the Invention

1. Field of the Invention

The present invention relates to constant velocity universal joints for use in drive line applications, that is to say particularly for automotive use, e.g. in the drive shafts of front wheel drive vehicles, but also in any applications in which it is desired to transmit rotational movement between two rotary shafts which are inclined to one another, at least at certain times.

2. Description of the Prior Art

The best known universal joint is probably the Cardan joint which comprises two yokes which are at right angles to one another and located at the ends of respective shafts and in whose ends are respective bores which extend perpendicular to the axis of the respective shaft and in which the ends of two opposed arms of a common cross piece are rotationally located. Such a joint can transmit rotational motion through a substantial angle and whilst the speed of the two shafts is always the same expressed in revolutions per minute, the speed of the output shaft varies cyclically over each revolution as the input shaft rotates at a constant speed. The reason for this is that the Cardan joint does not satisfy the basic relationships necessary if the instantaneous velocity of the output shaft is to be constant at all times with a constant input speed, namely firstly that the plane of contact between the two shafts must be held constant in space, secondly that the plane of contact must be perpendicular to the plane determined by the rotational axes of the two shafts and thirdly that the plane of contact must define an angle with the axis of each shaft which is equal to one half of the total joint angle.

Near constancy of velocity is achieved by the Double Cardan Universal Joint which comprises two Cardan joints in series, the output member of the first joint comprising the input member of the other joint. The ends of the two shafts are provided with cooperating support and centering means. The joint operates as a true constant velocity joint at one joint angle only but at other joint angles the variation in the output velocity is very much less than with e.g. a single Cardan joint. However, even this reduced velocity variation is unacceptable for many applications.

The necessary relationships for true constancy of velocity are achieved by the Rzeppa joint which comprises inner and outer races drivably connected by a plurality of balls which are positioned in the constant velocity plane by axially offset meridionally curved grooves and are maintained in this plane by a cage located between the two races. The torque transmitted by this joint is transmitted through the very small contact areas of the balls which skid in contact with the races, when the joint is deflected, and thus, at appreciable joint angles, the joint is subjected to very high wear. In practice, the spherical surfaces of the balls are in contact with the convex internal surfaces of the races which means that the contact is essentially point contact and thus that the surface stresses are extremely high. This is tolerable in practice only because high joint angles are only rarely used in most applications and then only for short periods of time. However, if a Rzeppa joint is operated at a significant joint angle and at high speed and/or high torque for an appreciable period of time wear and the generation of heat and noise are substantial and the joint is subject to premature failure.

German Patent No.914208 discloses a constant velocity joint in which two part-cylindrical recesses are formed in the opposed end of the two shafts. Slidably received in each recess is a part-cylindrical portion of a respective member or spider of generally U shape, at the end of each of whose limbs is an aperture defined by a cylindrical portion, the axis of which is perpendicular to that of the associated recess. Rotatably received in all four apertures is a central joint pin. Slidably received on the joint pin is a guide member which is keyed to two guide pins which are in sliding engagement with the internal surface of a respective part-cylindrical portion and are rotatably secured to the end of a respective one of the shafts.

Torque is transmitted through this known joint through the engaging surfaces of the joint pin and the spiders. Due to the fact that the engaging surfaces of the spiders are cylindrical the central pin is necessarily relatively small because otherwise the overall size of the joint would become unacceptably large. This means that the engaging surfaces are necessarily of small area which results in high surface loadings which in turn results in lubrication breakdown and in galling and ultimately welding or seizure of the engaging surfaces, if the joint is transmitting significant torque. Furthermore, when the two shafts are inclined, the guide member reciprocates longitudinally on the guide pin which means that the joint is not balanced and this results in unacceptable vibration when the joint rotates at high speed.

Accordingly it is an object of the invention to provide a constant velocity joint which overcomes the problems of the known joints and is cheap and simple to manufacture and which is capable of operating at high speeds and joint angles for an extended period of time without being subject to appreciable wear or the risk of premature failure. It is a further object to provide a constant velocity joint which is at least approximately statically and dynamically balanced at all times.

SUMMARY OF THE INVENTION

According to the present invention a constant velocity joint comprises two shafts with respective opposed ends in which respective part-cylindrical recesses are formed, the axes of which intersect at the geometrical centre of the joint, two spiders, each including an outer portion of part-cylindrical shape slidably received in a respective part-cylindrical recess and an inner portion affording a cylindrical surface which is in rotational sliding engagement with a corresponding cylindrical surface of a central member and whose axis is perpendicular to that of the part-cylindrical portion, the axes of the two cylindrical surfaces of the inner portions being coincident and constituting the axis of the central member which passes through the geometrical centre and is characterised in that the cylindrical surfaces of the inner portions are only part-cylindrical and that coupling means are provided which connect the two spiders and are arranged to transmit rotational movement between them such that the two spiders are constrained to rotate through equal distances but in opposite directions about the axis of the central member.

The joint of the present invention can be considered to be equivalent to two Oldham couplings, the output member of one, namely the central member, constituting the input member of the other, with the crucial difference that all the engaging surfaces are of part-cylindrical shape with the axes of all the cylinders intersecting at the geometrical centre of the joint. When the two shafts are aligned, the entire joint rotates as a solid body and torque is transmitted from one shaft to the central member via the two rotational couplings constituted by the engagement of the part-cylindrical recess in the shafts by the part-cylindrical portion of the associated spider and by the engagement of the part-annular cylindrical surface of the spider with the cylindrical surface on the central member. The torque is transmitted on from the central member to the other shaft by the two corresponding rotational couplings on the other side of the joint. If the two shafts are now inclined to one another relative reciprocating sliding rotational movement occurs of the surfaces of each of the couplings about the axis of the surfaces, the sliding motion at the two couplings on each side of the joint being at right angles and out of phase. The fact that the surfaces of the spiders which engage the central member are only part-cylindrical enables them to engage the same portion of the length of the central member and thus to have a substantially greater length in the direction of the axis of the central member. This means in turn that the torque is transmitted between the spiders and the central member through a much greater surface area than in the prior German patent.

The security of the rotational coupling between the spiders and the central member and thus its torque-transmitting ability is yet further substantially increased if the inner portion of each spider is of part-annular cylindrical shape and the central member affords two part-annular cylindrical recesses, each of which slidably receives a respective one of the inner portions.

In order for the joint to operate as a true constant velocity joint it is necessary for the conditions referred to above to be satisfied, in particular for the axis of the central member to bisect the joint angle. The axis of the central member has two degrees of freedom, that is to say it can move in the plane which passes through the geometrical centre of the joint and extends perpendicular to the surfaces of the two part-annular cylindrical recesses in the central member and in the plane perpendicular thereto which passes through the geometrical centre of the joint and in which the axes of the shafts lie, when they are coaxial. However, the two spiders are coupled together, preferably by gearing, such that they always rotate through equal distances but in opposite directions about the axis of the central member and the central axis thus necessarily always bisects the joint angle in the first of the planes referred to above. It can readily be shown that the geometry of the joint coupled with the control of the position of the axis of the central member in one plane means that the axis of the central member automatically tends to move to a position in which it bisects the joint angle in the other plane also.

The joint can run at high joint angles, at high speeds and for prolonged periods of time without being subject to premature failure and one important reason for this is that the loads are transmitted through the substantial area of the various part-cylindrical surfaces rather than through a number of essentially point contacts, as in the Rzeppa joint. As a result of the large surface areas in sliding contact, the Hertzian surface stress loads are minimized thus facilitating lubrication and the ability to transmit high torque at high speeds whilst maintaining the joint extremely compact. The static load carrying capacity of the joint is inherently high, even at high joint angles, due to the fact that most of the components are loaded in compression or shear and not bending. The joint is inherently self-aligning and its swing diameter, i.e. its maximum dimension transverse to the direction of the shaft axes, which is of importance to automative designers, is inherently small.

The coupling together of the two spiders so that they rotate in opposite directions but through the same distance may be effected in various ways but it is preferred that the coupling means comprises gear teeth formed on the internal cylindrical surface of each part-annular cylindrical portion and two spur gears which are rotatably mounted on the central member and which are in mesh with each other and with the gear teeth on a respective one of the part-annular cylindrical portions.

The two spur gears may be directly in mesh with one another. However, when the two spiders rotate away from the diametrically opposed position, their mass will be displaced to one side of the axis of the central member and whilst this may be acceptable for low speed applications it is likely to lead to unacceptable vibration at high speeds. It is therefore preferred that the spur gears are indirectly in mesh with one another via an elongate balancer member carrying a substantially linear array of gear teeth on each of two opposed surfaces, each spur gear being in mesh with a respective one of the linear arrays of gear teeth, the balancer member being so arranged that when the two spiders are diametrically opposed with respect to the axis of the central member the balancer member is symmetrically disposed with respect to the axis of the central member and that when the two spiders rotate to positions where they are disposed on one side of the axis of the central member the balancer member moves to the other side of the axis of the central member. In this embodiment the balancer member, which essentially constitutes a double sided rack, fulfils two separate functions. Firstly, it forms part of the coupling between the two spiders and secondly it moves in the opposite direction to the spiders and acts as a counterbalance. If its mass is appropriately matched to that of the spiders it can be ensured that the joint is substantially statically and dynamically balanced at all joint angles.

However, as the spiders rotate, their rate of lateral movement with respect to the central axis decreases due to the fact that they move on circular paths. If the balancer member moves a fixed distance for a given angular rotation of the spiders the balancing can only be approximate. However, it can be made more precise if the balancer member is arranged to move a decreasing distance as the spiders rotate further away from the diametrically opposed position and this may be achieved if the spur gears are of ovoidal cross-section and the substantially linear arrays of gear teeth are curved towards one another at their centres, whereby the rate of linear movement of the balancer member decreases as the spiders rotate about the axis of the central member away from the diametrically opposed position.

Whilst not essential for all applications, it is desirable that the joint be self-supporting and for this purpose the menders forming the various rotational couplings are preferably keyed together, though it is of course necessary that the keys are such as to permit the necessary relative rotational sliding movement of the engaging surfaces of the couplings. Cooperating arcuate tongues and grooves may be used for this purpose and this is perfectly adequate at all but high speeds. For high speed applications, the frictional losses associated with tongues and grooves may be unacceptable and they may be replaced by cooperating semi-circular grooves in the two members, which define ball races in which ball bearings are received. The ends of each ball race are preferably connected together by a passage to form a loop in which ball bearings may circulate or reciprocate.

In the preferred embodiment the opposed ends of the shafts carry respective flanges in which the part-cylindrical recesses are formed and whose external shape is substantially part-spherical, the joint being enclosed in an outer casing whose internal shape is substantially part-spherical and which is formed with openings through which the shafts pass. The joint thus has a generally spherical overall external appearance.

As mentioned above, the control of the axis of the central member so that it bisects the joint angle in the second plane referred to above as well as the first plane tends to occur automatically. However, a positive control of the position of the central axis in the second plane may nevertheless be desirable in some applications. This can be effected in various ways but in one embodiment the central member and the outer casing are provided with cooperating formations and the outer casing includes means arranged to alter its position and thus that of the cooperating formations in dependence on the joint angle whereby the axis of the central member is positively constrained to lie on the bisector of the joint angle.

In one embodiment the central member is provided with two opposed generally planar guide flanges, the plane of which is perpendicular to the axes of the shafts, when they are aligned, and includes the axis of the central element and the internal surface of the casing is provided with two diametrically opposed elongate grooves which lie on a first great circle and in which the free end of a respective guide flange is slidably received. The guide flanges and the elongate grooves then constitute the cooperating formations. Means are then required to vary the positions of the grooves in dependence on the joint angle and in one embodiment the internal surface of the casing is provided with an elongate groove which lies on a second great circle perpendicular to the first great circle and is situated midway between the two diametrically opposed grooves and which slidably receives two superposed part-spherical guide straps, one end of each of which is connected to a respective pivot peg which is received in a hole in the external surface of a respective one of the flanges at the end of the shafts so as to be rotatable with respect thereto about an axis which passes through the geometrical centre, whereby when the shafts are inclined to one another and are rotated the guide straps constrain the casing to move so that the axis of the central element, whose position in one plane is determined by the engagement of the guide flanges in the diametrically opposed grooves, always lies on the bisector of the angle defined by the axes of the two shafts. This construction inherently results in the outer casing cyclically accelerating and decelerating with respect to the remainder of the joint during rotation of the joint, when the axes of the shafts are inclined to one another. The variation in inertia of the casing as it does so is out of phase with that of the spiders and balancer member and it is preferred that the mass of the outer casing is so selected that its inertia variation, during rotation of the joint, when the axes of the shafts are inclined to one another, is substantially equal to that of the reciprocating spiders and balancer member and thus partially cancels it out.

Further features and details of the invention will be apparent from the following description of certain specific embodiments which is given by way of example only with reference to the accompanying drawings.

DESCRIPTION OF THE PREFERRED EMBODIMENT

Referring firstly to FIGS. 1 to 5, the joint comprises two shafts 2, at whose inner ends, which are spaced from and opposed to one another, there is a respective flange 4 whose external surface is part-spherical, whereby the flanges 4 have an appearance reminiscent of that of a mushroom. Formed in the inner surface of each flange 4 is a part-cylindrical recess or concavity 6, the axes of the two recesses being coincident, when the two shafts 2 are aligned, and intersecting at all times at the geometrical centre 20 of the joint. Slidably received in each recess 6 is an outer, part-cylindrical portion 8 of a respective spider 10, the other, inner portion 12 of each of which is of part-annular cylindrical shape and extends through less than 180°, e.g. 60° to 150°, and is slidably received in a respective part-annular cylindrical recess 14 in a central joint member 16. The two recesses 14 are separate in this embodiment but it will be appreciated that in certain constructions they could be coterminous and thus constitute a single annular recess. The axes of the two part-annular cylindrical portions 12 and the two part-annular cylindrical recesses 14 are coincident and indicated by 18 in FIG. 2 and pass through the geometrical centre point 20 of the joint.

Figure 1:
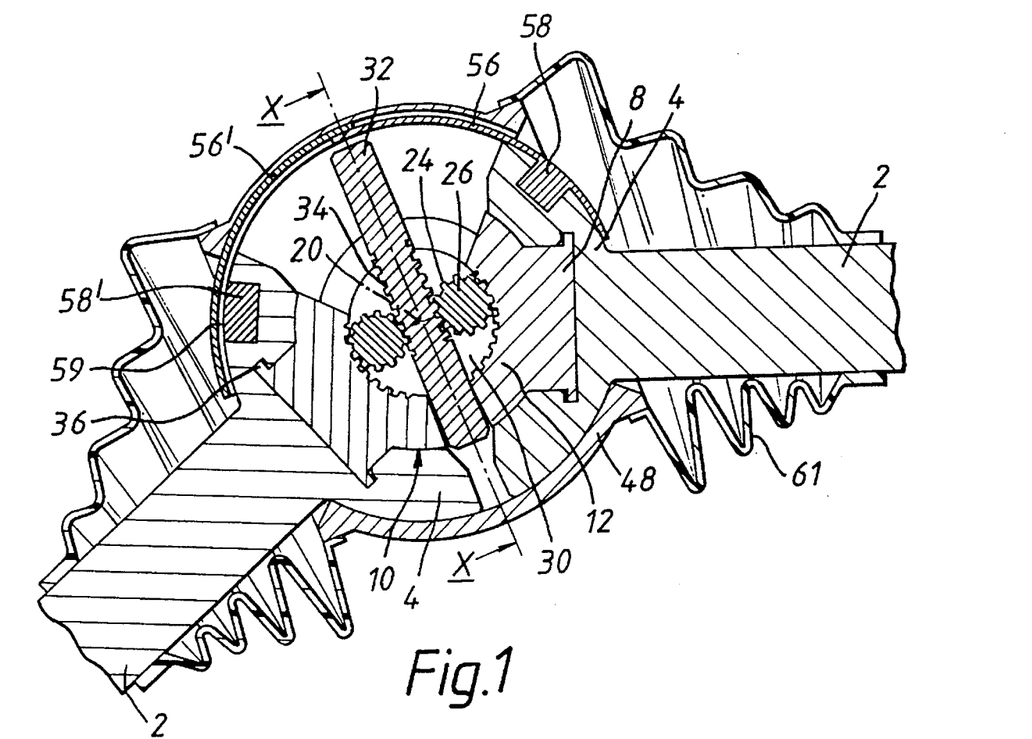
FIG. 1 is a central sectional view through a constant velocity joint in accordance with the invention, with the shafts at an angle in the plane of the drawing.
Figure 2:
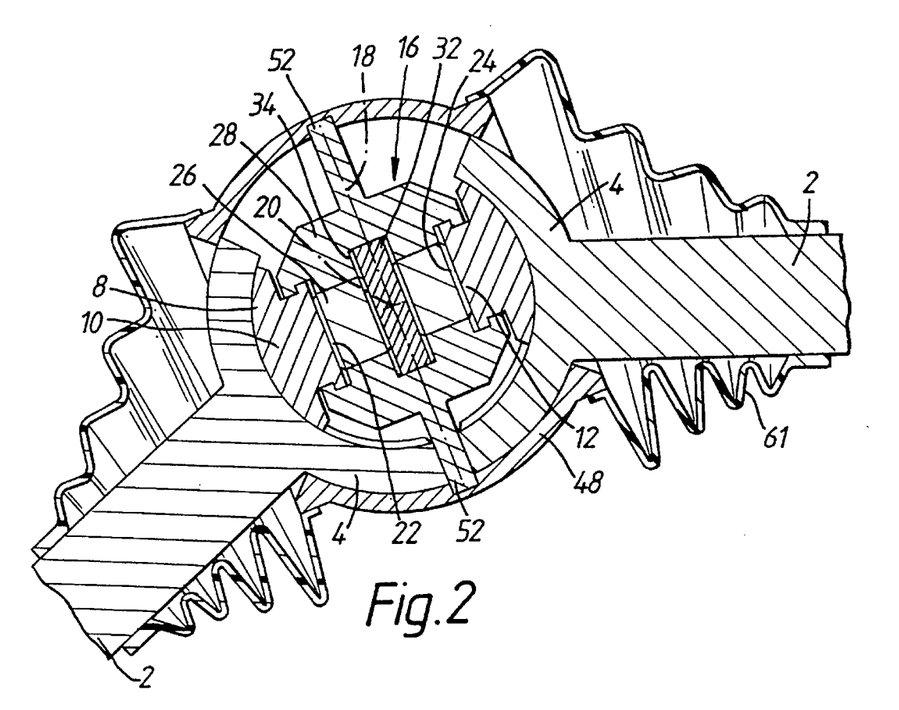
FIG. 2 is a central sectional view similar to that of FIG. 1 but on a plane at right angles to that of FIG. 1, with the shafts at an angle in the plane of the drawing.
Figure 5:
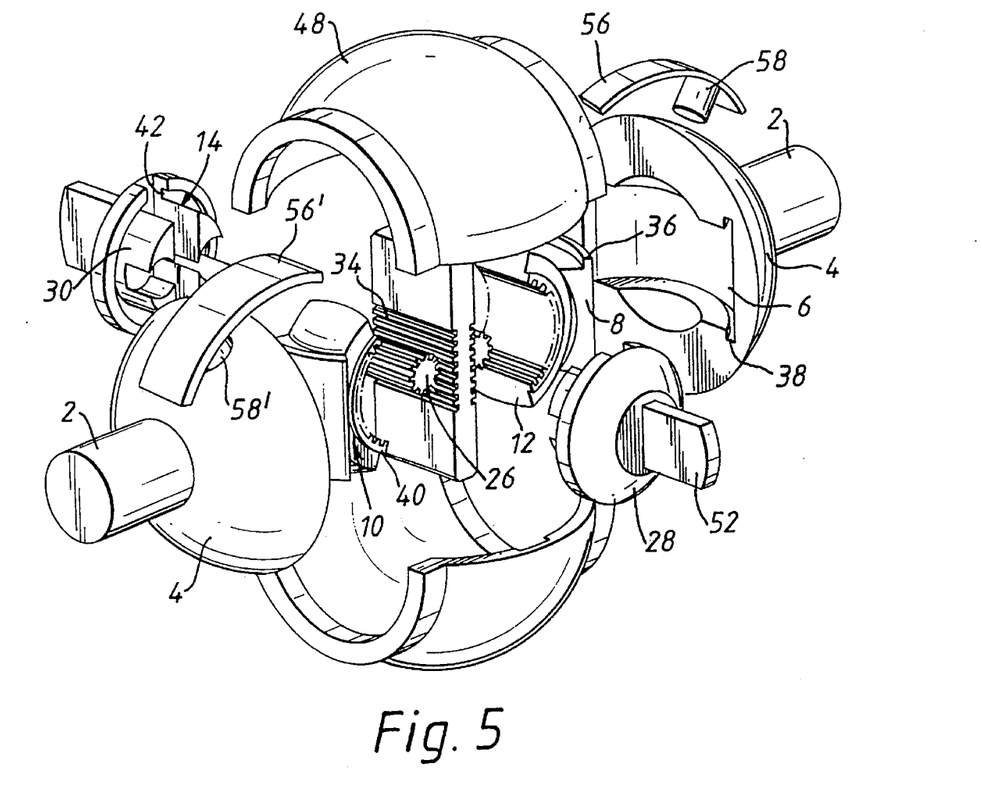
FIG. 5 is an exploded view of the components of the joint.

The part-cylindrical internal surface of each part-annular cylindrical portion 12 is provided with gear teeth 22 which are in mesh with corresponding gear teeth 24 on a respective spur wheel 26. The two spur wheels 26 are journalled in two spaced end caps 28 which constitute the bulk of the central member 16 and which each carry four equiangularly spaced formations 30. The free end surfaces of the formations 30 on the two end caps 28 engage one another and their external surfaces constitute the internal circular-section surface of the part-annular cylindrical recesses 14.

Located within the central member 16 and extending out of it on both sides in directions perpendicular to the axes of the two shafts 2 is an elongate balancer plate 32. Formed on the opposed surfaces of the balancer plate 32 are respective sets of rack teeth 34 which are in mesh with the spur teeth 24 on a respective spur wheel 26. The part-annular cylindrical portions 12 are free to slide in rotation about the axis 18 within the part-annular cylindrical recesses 14 and as they do so the meshing sets of gear teeth 22,24 result in rotation of the spur wheels 26 and thus in linear movement of the balancer plate 32. The two spiders 10 are thus geared together and constrained always to rotate about the axis 18 in opposite senses and through equal distances. The balancer plate 32 and the spur wheels 26 are so positioned that when the two shafts 2 are axially aligned the balancer plate projects an equal distance on each side of the central member 16. If one shaft is then inclined to the other about the axis 18, the relative movement of the spiders in one direction results in movement of the balancer plate in the other direction. The relative masses and the relative distances of movement are such that even when the shafts are inclined the joint remains substantially statically and dynamically balanced. By appropriately dimensioning the various components it would be possible to increase the mass of the balancer plate at its ends by making it of I section shape.

In order to ensure the structural integrity of the joint, the spiders 10 are keyed to their respective shafts 2 and to the central member 16. This keying must prevent relative movement in the radial direction, that is to say outwardly from the geometrical centre 20, but must not prevent relative rotational movement of the spiders 10 and the shafts 2 about the axis of the respective recess 6 or of the spiders 10 about the axis 18. In this embodiment this is achieved by a part-circular projection or ridge 36, whose centre lies on the axis of the associated recess 6, at each axial end of the part-cylindrical surface on each part-cylindrical portion 8 which engages in a corresponding part-circular undercut groove 38 at each axial end of the associated part-cylindrical recess 6 and by a similar part-circular projection or ridge 40, whose centre lies on the axis 18, at each axial end of the part-cylindrical toothed surface of each part-cylindrical annular portion 12 which engages in a corresponding part-circular undercut groove 42 formed in the two end caps 28 around the upstanding formations 30.

In use, if the two shafts are axially aligned and one of them is rotated, this rotational movement is transmitted to the associated spider by virtue of the rotational coupling constituted by the engagement of the part-cylindrical portion 8 of the spider in the part-cylindrical recess 6 at the end of the shaft. The rotation is then transmitted to the central member 16 by virtue of the rotational coupling constituted by the engagement of the part-annular cylindrical portion 12 of the spider in the part-annular cylindrical recess in the central member. The rotational movement is then transmitted by the corresponding rotational couplings on the other side of the joint through the other spider to the other shaft. The entire joint thus rotates about the common axis of the two shafts as a solid body and acts effectively as two cylindrical Oldham couplings in series with the central member 16 acting as the output member of one Oldham coupling and the input member of the other Oldham coupling.

If the two shafts are now inclined to one another, the relative rotation is accommodated by a combination of relative rotation of the part-cylindrical portions 8 in the part-cylindrical recesses 6 and relative rotation of the part-annular cylindrical portions 12 in the part-annular cylindrical recesses 14, that is to say by relative sliding motion about the respective axes of the pairs of cooperating part-cylindrical surfaces. The gap between the edges of the flanges 4 decreases on one side and increases on the other. Due to the fact that the two spiders are rotationally coupled together, they are constrained to rotate through equal but opposite distances about the central axis 18 of the central member 9. This rotation produces linear movement of the balancer plate 32 by a distance which ensures that the static and dynamic balance of the central member is retained. As the shafts 2 rotate the cooperating surfaces of the portions 8 and the recesses 6 reciprocate in sliding about their axes and the cooperating surfaces of the portions 12 and the recesses 14 reciprocate in sliding also about their axes, in each case by a distance which is a function of the joint angle. This latter rotational reciprocation results in linear reciprocation of the balancer plate 32 which ensures that the joint remains dynamically and statically balanced. All the axes of the various part-cylindrical surfaces continue to intersect at the geometrical centre 20.

In order for the constancy of the velocity of the joint to be assured it is necessary that the axis 18 of the central member 16, i.e. the axis of the part-annular cylindrical recesses 14, accurately bisects the joint angle at all times. This occurs automatically in one plane due to the fact that the two spiders 10 are constrained to rotate by equal and opposite amounts with respect to the central member 16 and tends to happen in any event in the other plane due to the geometry of the joint but in this preferred embodiment this is ensured by positively moving the central element so that this necessary condition is necessarily always fulfilled. The joint is enclosed by an outer casing comprising two interconnected casing halves 48 whose internal surface is part-spherical and engages the part-spherical external surface of the flanges 4. The casing is provided with two openings through which the shafts 2 pass and which are sufficiently large to accommodate the maximum anticipated angular movement of the shafts. Formed in the inner surface of the casing opposite each end cap 28 is a groove or trough 50, the two grooves 50 extending over part of the same great circle. Integral with each end cap 28 is a generally planar flange 52 which extends parallel to the axis 18 of the central member 16 and whose free end is slidably received in a respective groove 50. Also formed in the inner surface of the casing 48 midway between the poles opposite the centres of the end caps 28 when the two shafts are aligned is a further groove or trough 54 which extends over part of a great circle perpendicular to the grooves 50. Slidably received in the groove 54 are two overlying part spherical guide straps 56, 56' at whose opposed ends there is a respective integral pivot peg 58,58' which is rotatably received in a hole in the outer surface of a respective one of the flanges 4. The holes are so aligned and dimensioned that the pegs 58,58' may rotate in them about axes which pass through the geometrical centre 20 of the joint.

Figure 3:
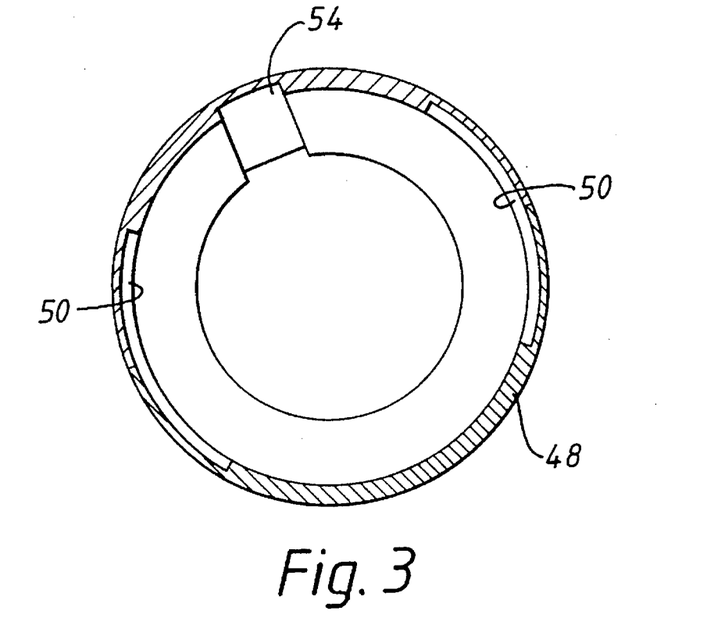
FIG. 3 is a sectional view of the outer casing on the line X—X in FIG. 1.
Figure 4:
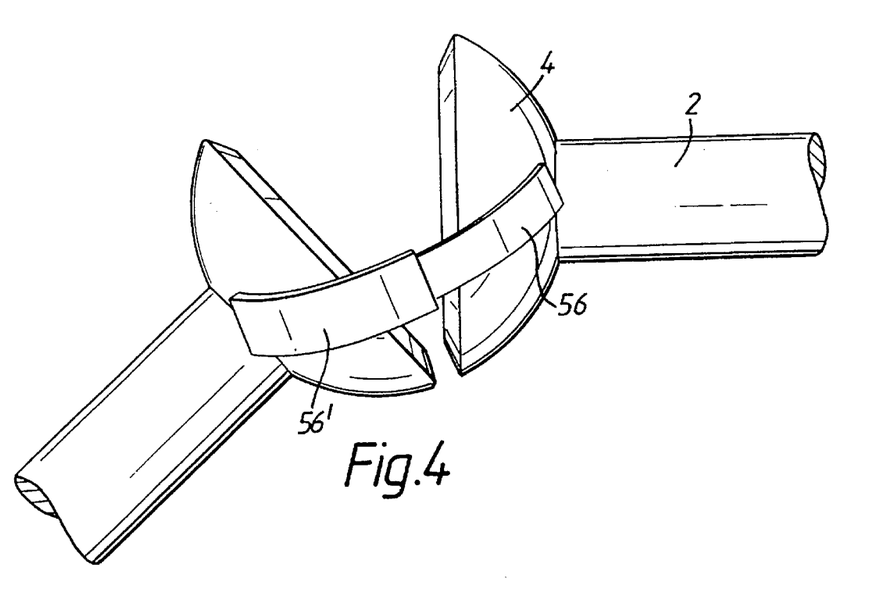
FIG. 4 is a view of the exterior of the two shafts and the guide straps with the outer casing and the internal members of the joint removed.

In order that the guide straps 56,56' may operate as smoothly and as effectively as possible on the edges of the groove 54 it is desirable that they are as long as possible and in the illustrated embodiment their length is such that in certain rotational positions of the joint the straps pass over the pivot peg of the other strap. In order to render this possible, the strap 56' is wider than the strap 56 and overlies it and the peg 58' is of greater diameter than the peg 58. The peg 58' is provided with a slot 59 in its head through which the strap 56 may slide.

The joint is substantially sealed by two flexible, elastomeric, tubular boots 61, one end of which extends around and is connected to the edge of a respective one of the openings in the casing 48 and the other end of which extends closely around and may form a sliding seal with the surface of the associated shaft or be connected to it.

As mentioned above, when the two shafts 2 are inclined, the gap between the edges of the flanges 4 is smaller on one side than the other. As the guide straps 56, 56' rotate past the narrowest portion of the gap the pegs 58, 58' are constrained to rotate in their holes and the action of the straps 56, 56' against the edges of the groove 54 results in the casing 48 rotating more slowly than the remainder of the joint until the straps 56, 56' reach the widest portion of the gap between the edges of the flanges 4. Thereafter, the casing is constrained to rotate more rapidly than the remainder of the joint. The degree of overlap of the straps thus varies cyclically as the joint rotates and as the degree of overlap approaches the maximum the strap 56 slides through the slot 59 in the pivot peg 58' which is connected to its strap 56' by fillets of material which extend upwardly on each side of the gap 59. The action of the straps 56, 56' in the groove 54 inherently results in the grooves 50 always lying on the bisector of the joint angle in the second plane. The orientation of the central member 16 is determined by the position of the grooves 50 due to the fact that the flanges 52 are slidably received in the grooves 50 with substantially no lateral clearance whereby the axis 18 of the central member 16 always precisely bisects the joint angle in the second plane also and thus the necessary condition for constancy of velocity of the joint is met.

As mentioned above, the outer casing 48 has a rotational reciprocating motion superimposed on its normal rotational movement when the shafts 2 are inclined to one another. This results in a cyclical variation in its inertia which can be made use of by ensuring that it is out of phase with the inertia variation of the spiders and the balancer plate, as they reciprocate. By appropriate dimensioning it can be ensured that these two inertia variations partially cancel out.

Figure 6:
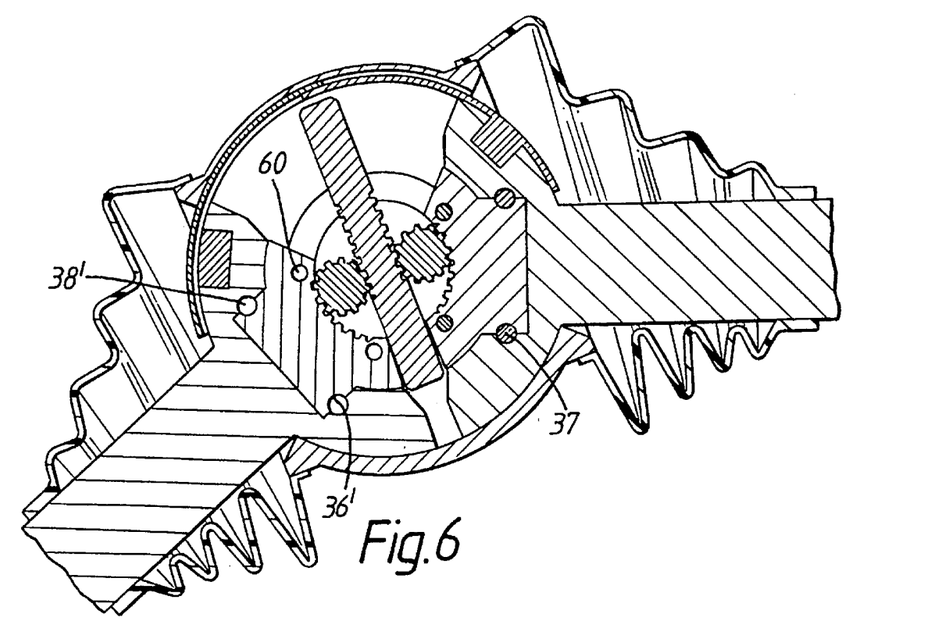
FIGS. 6 and 7 are views similar to FIGS. 1 and 2 of a modified construction of constant velocity joint in accordance with the invention.
Figure 7:
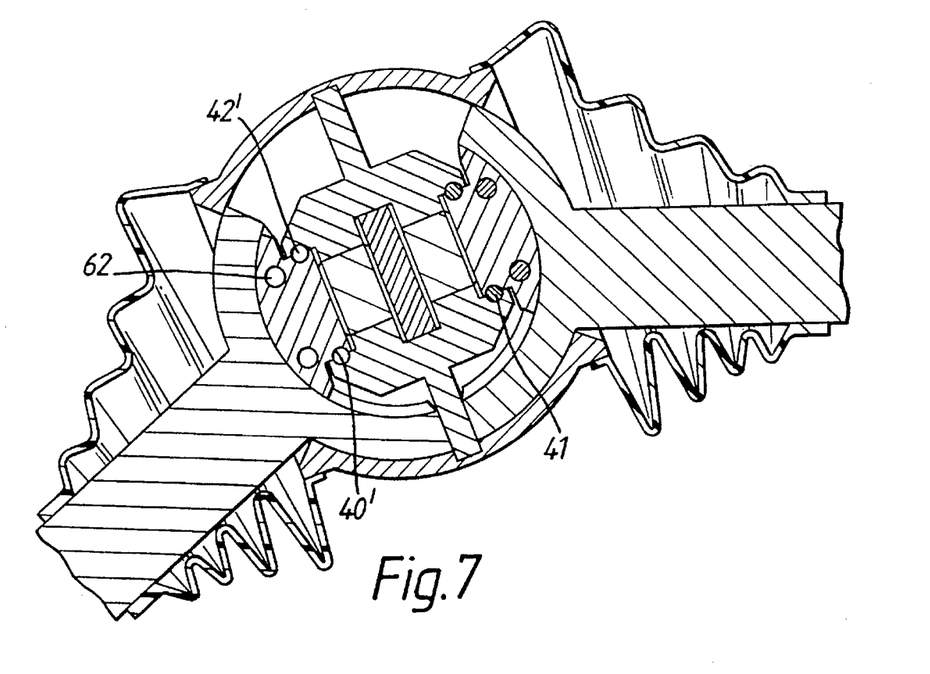

In the embodiment described above the spiders are keyed to the flanges 4 and the central member 16 by cooperating pairs of tongues and grooves and such keying is highly desirable to produce mechanical integrity of the joint, though is not essential if mechanical integrity is ensured by some other means. However, if the joint is intended for high speed applications, the frictional losses of the tongue and grooves keys may be unacceptable and this potential problem is overcome by the modified construction illustrated in FIGS. 6 and 7 in which the tongues and grooves are replaced by recirculating ball races. The tongues and grooves 36, 38 and 40, 42, respectively are replaced by arcuate grooves 36', 38' and 40' and 42', respectively, of semi-circular cross-section, each cooperating pair of which is occupied by a plurality of ball bearings 37 and 41, respectively, which are shown only on one side of the joint in FIGS. 6 and 7 for the sake of clarity. The two grooves 36' in each spider are connected by a recirculating passage 60 extending through the spider between the ends of the grooves to form a continuous loop within which, in use, balls rotate back and forth and act both as a bearing and as a key between the spider and the associated shaft. Similarly, the grooves 40' in each spider are connected by a recirculating passage 62 extending through the spider between the ends of the grooves to form a further continuous ball loop. Due to the decreased frictional resistance this modified construction is capable of operating at high joint angles of up to e.g. 45° or more at high speeds for prolonged periods of time without any problem and, in particular, without any premature reduction in its service life. An alternative possibility is to omit all forms of keying and to make the outer casing 48 rather stronger and serve a structural function so that its sliding engagement with the external part-spherical surface of the flanges 4 is sufficient to retain all the components of the joint in the desired spatial relationship.

Figure 8:
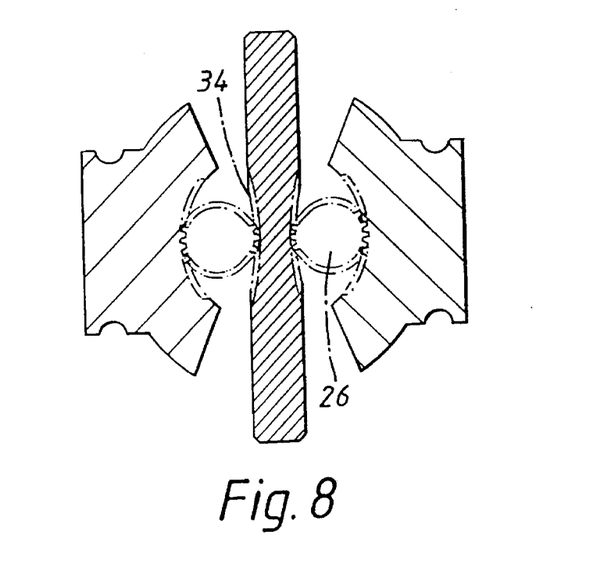
FIG. 8 is a scrap sectional view of the central portion of a further modified construction.

As described above, the balancer member 32, which constitutes a double-sided rack, serves two separate functions, one of which is to serve as part of the gearing between the two spiders and the other of which is to serve as a counterbalance to maintain the joint in balance by moving in one direction with respect to the axis of the central member as the spiders rotate in opposite directions so that their combined mass moves in the opposite direction. However, in the embodiment described above, the rack moves a constant distance for each unit of angular rotation of the spiders whilst the mass of the spiders moves a progressively decreasing distance away from the central axis with progressive rotation because they move on a circular path. This means in practice that their mass will be only approximately balanced by the balancer member at all but one specific position. This will not be a problem except at very high speeds but this potential problem is solved in the modified construction of FIG. 8 in which the spur gears 26' are of ovoidal cross-section and the two sets of rack teeth 34 are curved away from the associated spur gear, that is to say curve towards one another, in their central region. The spur gears are arranged so that their apex engages the associated rack teeth when the balancer member is in the central position, i.e. when the two spiders are diametrically opposed. As the spiders rotate and thus move in one direction with respect to the central axis the balancer member therefore moves by a progressively decreasing distance in the opposite direction. The shape of the spur gears is so selected that the balancer member more closely or precisely counterbalances the spiders in all their rotational positions.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letter Patent of the United States is:

1. A constant velocity universal joint comprising two shafts, said shafts having respective opposed ends and respective part-cylindrical recesses formed in said opposed ends of said shafts, said part-cylindrical recesses having respective axes which intersect at a geometrical centre of said joint, two spiders, each said spider including an outer portion of part-cylindrical shape, said outer portion having an axis and being slidably received in a respective one of said part-cylindrical recesses, and an inner portion affording a part-cylindrical surface having an axis, said axis of said part-cylindrical surface of said inner portion extending perpendicular to said axis of said outer portion, a central member having a cylindrical surface having an axis, the cylindrical surface of said central member facing said part-cylindrical surfaces of said inner portions of said two spiders, said axes of said part-cylindrical surfaces of said inner portions of said two spiders being coincident and constituting an axis of said central member passing through said geometrical centre, and coupling means connecting said two spiders and arranged to transmit rotational movement of each of said two spiders about said axis of said central member to the other of said two spiders such that said two spiders are constrained to rotate through equal distances but in opposite directions about said axis of said central member.

2. A joint as claimed in claim 1 wherein said inner portion of each said spider is of part-annular cylindrical shape and said central member affords two part-annular cylindrical recesses, each of which slidably receives a respective one of said inner portions.

3. A joint as claimed in claim 2 wherein said coupling means comprises gear teeth formed on said part-cylindrical surface of each said part-annular cylindrical portion and two spur gears which are rotatably mounted on said central member and which are in mesh with each other and with said gear teeth on a respective one of said part-annular cylindrical portions.

4. A joint as claimed in claim 3 wherein said spur gears are indirectly in mesh with one another and said coupling means includes an elongate balancer member which has two opposed surfaces and carries a substantially linear array of gear teeth on each of said two opposed surfaces, each said spur gear being in mesh with a respective one of said linear arrays of gear teeth, said balancer member being so arranged that when said two spiders are in a diametrically opposed position with respect to said axis of said central member said balancer member is symmetrically disposed with respect to said axis of said central member and that when said two spiders rotate to positions where they are disposed on one side of said axis of said central member said balancer member moves to the other side of said axis of said central member.

5. A joint as claimed in claim 4 wherein said spur gears are of ovoidal cross-section and said substantially linear arrays of gear teeth are curved towards one another at their centres, whereby the rate of linear movement of said balancer member decreases as said spiders rotate about said axis of said central member away from said diametrically opposed position.

6. A joint as claimed in claim 5 wherein said gear teeth on said inner part-annular cylindrical portions have a pitch circle and the mass of said spiders and of said balancer member and the radius of said pitch circle are such that said spiders and said balancer member are substantially statically and dynamically balanced at all times.

7. A joint as claimed in claim 4 wherein said gear teeth on said inner part-annular cylindrical portions have a pitch circle and the mass of said spiders and of said balancer member and the radius of said pitch circle are such that said spiders and said balancer member are substantially statically and dynamically balanced at all times.

8. A joint as claimed in claim 1 wherein each said spider is keyed to the associated said shaft by first retaining means to prevent relative linear movement parallel to the axis of said shaft.

9. A joint as claimed in claim 8 wherein said first retaining means comprises two arcuate tongues which are coaxial with said part-cylindrical recesses and are formed on one of said opposed end of the associated said shaft and said spider and engage in complementary arcuate grooves formed in the other of said opposed end of the associated said shaft and said spider.

10. A joint as claimed in claim 8 wherein said first retaining means comprise two arcuate part-circular section grooves which have two ends and are formed on said spider coaxial with said part-cylindrical recesses and which cooperate with complementary part-circular section grooves formed in said opposed end of the associated said shaft, each cooperating pair of grooves being occupied by a plurality of ball bearings, said two ends of each groove in said spider being connected by a passage in said spider through which said ball bearings may recirculate.

11. A joint as claimed in claim 1 wherein each said spider is keyed to said central member by second retaining means to prevent relative linear movement perpendicular to said axis of said central member.

12. A joint as claimed in claim 11 wherein said second retaining means comprise two arcuate tongues, said arcuate tongues having an axis which is coincident with said axis of said central member, said arcuate tongues being formed on one of said spider and said central member and engaging in complementary arcuate grooves formed in the other of said spider and said central member.

13. A joint as claimed in claim 11 wherein said second retaining means comprises two arcuate part-circular section grooves, which have an axis and two ends and are formed in said spider, said axis of said grooves being coincident with said axis of said central member and cooperating with complementary part-circular section grooves formed in said central member, each cooperating pair of grooves being occupied by a plurality of ball bearings, said two ends of each said groove in said spider being connected by a passage in said spider through which said ball bearings may recirculate.

14. A joint as claimed in any one of the preceding claims wherein said opposed ends of said shafts carry respective flanges in which said part-cylindrical recesses are formed and whose external shape is substantially part-spherical, said joint being enclosed in an outer casing whose internal shape is substantially part-spherical and which is formed with openings through which said shafts pass.

15. A joint as claimed in claim 14 wherein said central member is provided with two opposed generally planar guide flanges having free ends, the plane of which is perpendicular to said axes of the shafts, when they are aligned, and includes said axis of said central element, and the internal surface of said casing is provided with two diametrically opposed elongate grooves which lie on a first great circle and in which said free end of a respective said guide flange is slidably received.

16. A joint as claimed in claim 15 wherein said internal surface of said casing is provided with an elongate groove which lies on a second great circle perpendicular to said first great circle and is situated midway between said two diametrically opposed grooves, said joint further including two superposed part-spherical guide straps, which are slidably received in said elongate groove and one end of each of which is connected to a respective pivot peg, each pivot peg being received in a respective hole in the external surface of a respective one of said flanges at said opposed ends of said shafts so as to be rotatable with respect thereto about an axis which passes through said geometrical centre, whereby when said shafts are inclined to one another and are rotated said guide straps constrain said casing to move so that said axis of said central element, whose position in one plane is determined by the engagement of said guide flanges in said diametrically opposed grooves, always lies on the bisector of the angle defined by said two shafts.

17. A joint as claimed in claim 16 wherein the length of said guide straps is such that they pass over said pivot peg of the other said strap during rotation of said joint at high joint angles, that one of said guide straps which is closer to said outer casing being wider than the other of said guide straps and being connected to a pivot peg whose diameter is greater than that of the other pivot peg, the larger said pivot peg having a slot formed through its head through which the narrower said guide strap may slide.

18. A joint as claimed in claim 17 wherein the mass of said outer casing is so selected that its inertia variation, during rotation of said joint, when said shafts are inclined to one another, is substantially equal to that of said reciprocating spiders and balancer member and thus partially cancels it out.

19. A joint as claimed in claim 16 wherein the mass of said outer casing is so selected that its inertia variation, during rotation of said joint, when said shafts are inclined to one another, is substantially equal to that of said reciprocating spiders and balancer member and thus partially cancels it out.

* * * * *